United States Patent [19]

Giolito

[11] 4,163,767

[45] Aug. 7, 1979

[54] POLYALKYLENE GLYCOL ALKYL POLYPHOSPHITES

[75] Inventor: Silvio L. Giolito, Whitestone, N.Y.

[73] Assignee: Stauffer Chemical Company, Westport, Conn.

[21] Appl. No.: 873,468

[22] Filed: Jan. 30, 1978

Related U.S. Application Data

[63] Continuation-in-part of Ser. No. 611,469, Sep. 8, 1975, abandoned, which is a continuation of Ser. No. 483,606, Jun. 27, 1974, Pat. No. 3,986,990, which is a continuation of Ser. No. 322,595, Jan. 10, 1973, abandoned, which is a continuation-in-part of Ser. No. 166,295, Jul. 26, 1971, abandoned.

[51] Int. Cl.$^2$ .............................. C07F 9/08; C08J 9/00
[52] U.S. Cl. .................................... 260/929; 521/108
[58] Field of Search ........................................... 260/929

[56] References Cited

U.S. PATENT DOCUMENTS 3,167,575  1/1965  Friedman ...................... 260/929 OR

FOREIGN PATENT DOCUMENTS 1411831  8/1965  France ...................................... 260/929

*Primary Examiner*—Anton H. Sutto
*Attorney, Agent, or Firm*—Roger S. Benjamin

[57] ABSTRACT

A polyphosphorous mixed phosphite-phosphonate polymer flame retardant having an OH number less than one and containing both alkyl phosphite and haloalkyl phosphonate linkages.

4 Claims, No Drawings

POLYALKYLENE GLYCOL ALKYL POLYPHOSPHITES

RELATED APPLICATIONS

This case is a continuation-in-part of application Ser. No. 611,469 filed Sept. 8, 1975, now aabandoned, which is a continuation of application Ser. No. 483,606 filed June 27, 1974, now U.S. Pat. No. 3,986,990, which was a continuation of application Ser. No. 322,595 filed Jan. 10, 1073 and now abandoned, which was a continuation-in-part of application Ser. No. 166,295 filed July 26, 1971 and now abandoned.

BACKGROUND OF THE DISCLOSURE

In the polyurethane field, increased interest is being shown in compounds which can be added to the polyurethane polymers to act as fire retardant agents. One such group of reactive flame retardants are the polyalkylene glycol phosphites such as those described in U.S. Pat. No. 3,009,939. However these materials, due to their high OH numbers and crosslinking tendency, are unsuitable for use in flexible urethane foams. In U.S. Pat. Nos. 3,081,331 and 3,142,651, there is disclosed a method of forming polyalkylene glycol polyphosphites having up to 10 phosphite groups in the polymer chain by reacting a trialkyl phosphite with a polypropylene glycol in a molar ratio of 2.1 to 2.5 moles of glycol per mole of phosphite. These materials are also unsuitable for use in flexible urethane foams as a result of their high OH numbers and their tendency to crosslink.

Another attempt at employing reactive flame retardants, described in U.S. Pat. Nos. 3,142,651 and 3,092,651, involves the use of polypropylene glycol poly-hydrogenphosphonates produced by a thermal polymerization. Likewise, polyalkylene glycol hydrogen polyphosphonates have also been produced by transesterifying a secondary hydrogen phosphonate with a polyalkylene glycol according to the procedure outlined in British Pat. Nos. 796,446 and 1,011,118. However, many of these materials have relatively high acidity, causing them to react with and thereby deactivate certain catalyst systems generally used in the formation of polyurethane polymers such, for example, as tertiary amine compounds. The first method has the additional drawback of contamination of the product by the alkylene glycol byproduct, which contamination is not easily removed.

In order to increase the flame retardancy of some of the above described phosphorus compounds, which have low phosphorus content, the prior art has attempted to incorporate various halogen containing substituents into the above described molecules. Thus, U.S. Pat. No. 3,159,605 describes the reaction of halogenated methanes with these compounds. However, these materials like their precursors, have many drawbacks. In particular these products have high OH numbers and low phosphorus content thereby rendering them unsuitable as flame retardants in flexible urethane foams.

It is an object of the present invention to prepare novel polyalkylene glycol alkyl polyphosphites which are suitable as flame retardants for urethane foams, and particularly flexible urethane foams.

It is another object of the present invention, to produce polyalkylene glycol alkyl polyphosphites which have relatively low OH numbers and acidity, high phosphorus content and little if any crosslinking tendency when compared to those flame retardants described in the prior art.

Still a further object of the present invention is to produce mixed phosphite-phosphonate polymer flame retardants containing both alkyl phosphite and haloalkyl phosphonate linkages. These phosphite-phosphonate polymer flame retardants have OH numbers of less than one.

Still other objects will become apparent from the detailed description given hereinafter.

DETAILED DESCRIPTION OF THE DISCLOSURE

The present invention relates to novel polyalkylene glycol alkyl polyphosphites which are suitable for use as flame retardant intermediates for the preparation of flame retardants for flexible urethane foams. More particularly, the present invention relates to novel polyalkylene glycol alkyl polyphosphites characterized by low OH numbers and acidity, by linear polymer chains, and by little if any crosslinking tendency. These novel polyphosphites are produced by transesterifying a tertiary phosphite with a polyalkylene glycol in a mole ratio of from 1 to 1.5 moles of phosphite per mole of glycol.

The compounds of the present invention are characterized by low OH numbers. Normally the OH number will be below 200 and is preferably below about 100. The low OH number is attributable at least in part to the fact that these polyphosphites are predominantly linear polymers having longer chains than the previously disclosed phosphites of comparable glycols and to the fact that the side chains attached to the phosphite groups are alkyl rather than free polyalkylene hydroxyl side chains, as in the prior art compounds. As a result of the above characteristics, the polyphosphites of the present invention exhibit little crosslinking, either initially or when polymerized with foam forming components. Furthermore, this combination of properties results in a flame retardant which, when incorporated into a flexible urethane foam vastly improves the flame retardance of said foam without materially affecting the physical properties of it.

An idealized structure for the compounds of the present invention is as follows:

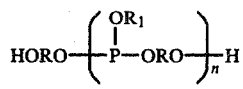

wherein $R_1$ is an alkyl residue from the starting tertiary phosphite, R is a polyalkylene glycol residue, and n is a number in the range from about 2 to about 50, and preferably from about 4 to about 10. The term alkyl residue as designated by $R_1$ is preferably $C_1$–$C_{10}$ alkyl and most preferably methyl or ethyl. It is understood that this idealized structure is intended to cover mixtures of polyphosphites having an average chain length of n rather than just pure compounds.

The term polyalkylene glycol residue, designated by R, is meant to define that portion remaining after two hydroxy groups have been removed from a polyalkylene glycol having the formula:

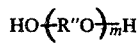

wherein R" is an alkylene group of from 2 to about 20 carbon atoms, said alkylene group being straight or branch chained or mixtures thereof, and m designates the number of repeating alkylene ether units and is normally from 2 to about 20.

The tertiary phosphite used to prepare the polyalkylene glycol alkyl polyphosphite of the present invention has the general formula:

wherein each $R_1$ is as defined above. The phosphites are illustrated by the following: trimethyl phosphite, triethyl phosphite, tripropyl phosphite, tributyl phosphite, trioctyl phosphite, dimethyl ethyl phosphite, diethyl methyl phosphite, and the like. Trimethyl and triethyl phosphite are particularly preferred, with trimethyl phosphite being most preferred.

The above described tertiary phosphite is transesterified with a polyalkylene glycol having the formula:

wherein R" and m are as described above. Illustrative of the polyalkylene glycols which can be employed in the present invention are the following: diethylene glycol, triethylene glycol, dipropylene glycol, tripropylene glycol, tributylene glycol, polyethylene glycols wherein the average number of ether units is 2, polypropylene glycols wherein the average number of ether units is 14, trihexylene glycol and the like. Particularly preferred glycols are diethylene glycol, dipropylene glycol, triethylene glycol and tripropylene glycol; with diethylene glycol being most preferred. It is understood that these propylene glycols can be primary, secondary or mixtures thereof.

In order to form the polyphosphite of the present invention, the tertiary phosphite and the polyalkylene glycol must be reacted in critical proportions. Thus, the phosphite should be present in an amount from about 1 to about 1.5 moles per mole of the glycol. The preferred range for this preparation is from 1 to about 1.2 moles of phosphite per mole of glycol. If the glycol is reacted in quantities greater than 1 to 1 with the phosphite, the product will contain primarily the undesirable mono, di, and triphosphites and, more, importantly, will have a substantial amount of free alkylene hydroxyl groups attached to the phosphite group.

The above disclosed transesterification reaction is normally conducted by mixing the phosphite and glycol in the presence of any of the well known transesterification catalysts. Particularly useful catalysts are the alkali metal alcoholates and phenolates such as sodium methylate, sodium decylate, sodium phenolate, and the like. These catalysts are normally employed in an amount of from about 0.01 to about 10 percent, by weight, of the entire reactant mixture. The reaction temperature should initially be kept below the boiling point of the lowest boiling reactant in order to avoid the loss of that reactant. Although the reaction can be conducted at room temperature, i.e. 20° C., it is preferred to conduct it as close to the upper limit as possible in order to increase the rate of reaction. Thus, in the case where trimethyl phosphite is employed as the tertiary phosphite, the reaction temperature is preferably within the range of 80° C. to 100° C. and should not be allowed to rise above 105° C. until at least one $R_1$ group on each of the phosphite molecules has been replaced with a polyalkylene glycol. This can normally be determined by monitoring the amount of alkanol which has been evolved.

While the reaction can be run to completion at these temperature ranges, it has been found to be advantageous to raise the temperature after this initial replacement of one of the $R_1$ groups on the starting phosphite up to a limit of about 200° C. and most preferably up to about 150° C. As stated above, the point at which the temperature should be raised can be determined by monitoring the amount of by-product alkanol produced. Thus, when one mole of trimethyl phosphite is being transesterified, the reaction temperature can be raised after one mole of methanol has been evolved. The transesterification is completed when two moles of methanol have been evolved. The degree of polymerization of the polyphosphite can be controlled to an extent by varying the time of the reaction. Furthermore, the polymer length can be monitored by measuring the viscosity buildup during the reaction according to well known techniques.

The transesterification reaction can optionally be carried out in the presence of an inert solvent, however, such solvent is not required for the practice of the present invention. The term inert solvent is meant to designate any solvent which does not react with the starting materials or products of the present invention. Suitable solvents include the alkylated benzenes such as ethyl benzene, diethyl benzene, toluene, the xylenes, and the like.

The acid numbers of the compounds of the present invention are normally below about 2 mgs. of KOH per gram of the polyalkylene glycol polyphosphorus compounds. This low acidity makes these compounds relatively unreactive toward the polymerization catalysts employed in producing the polyurethane foams.

While the compounds of the present invention can be used by themselves to improve the flame retardance of flexible urethane foams, it has been found desirable to increase the flame retardance of these polyphosphites by reacting them with a carbon tetrahalide. Thus, the compounds of the present invention are also useful as intermediates in the preparation of flame retardants which, when employed in sufficient quantity, yield self-extinguishing polyurethane foams. This property is particularly important in the area of flexible foams due to their wide use in hospitals, homes and automobiles. Suitable carbon tetrahalides for reaction with the polyphosphites of the present invention are represented by the following formula:

wherein X is a halogen such as chlorine and bromine and are exemplified by carbon tetrachloride and carbon tetrabromide.

The product of the reaction of the polyalkylene glycol alkyl polyphosphites with the carbon tetrahalide mentioned above is a polyphosphorus mixed phosphite-phosphonate polymer having an OH number less than one and containing both alkyl phosphite and halophosphonate linkages. This phosphite-phosphonate polymer is represented by the formula:

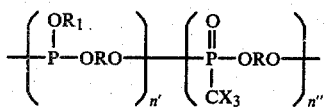

(I)

wherein $R_1$ is alkyl; R is a polyalkylene glycol residue defined as that portion derived from a polyalkylene glycol having the formula:

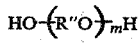

wherein R" is an alkylene group of from 2 to about 20 carbon atoms, and m designates the number of repeating alkylene ether units and is from 2 to about 20; X is halogen; and n' and n" are numbers such that the sum of n' and n" is in the range from about 4 to about 50. Preferred flame retardant phosphitephosphonate polymers are those of preceding Formula (I) wherein $R_1$ is methyl; X is selected from chlorine and bromine; R is a polyalkylene glycol residue selected from the group consisting of diethylene glycol, dipropylene glycol, triethylene glycol, and tripropylene glycol; and where the sum of n' and n" is an integer in the range of from about 4 to about 10.

Normally, the compounds of the present invention, or their derivatives as described above, can be employed in amounts of from about 5 to about 30 percent by weight of the entire foam forming mixture. It is understood, however, that this amount will vary depending upon the particular foam being used, and that the required proportions can easily be determined with a minimum amount of blending work.

While the compounds of the present invention are primarily intended for use in urethane foams, it is contemplated that they can also be used in a wide variety of polymeric systems. Illustrative of these systems are: polyesters, polyolefins, cellulose ethers and esters, urethane coatings and elastomers, polymethyl methacrylates, polyvinyl chloride, and many others. Furthermore, the compounds of the present invention can also be employed in combination with any of the known flame retardants in foams or polymeric systems.

The polyurethane foams within which the flame retardants described above are incorporated as well known in the art. They are produced by the reaction of a di- or polyisocyanate and a di- or polyhydroxy (polyol) compound in the presence of a blowing agent and a catalyst. The foams can be made by any of the basic techniques used in foam formation; i.e., the prepolymer technique, the semiprepolymer technique or the one-shot process. These techniques are well known and described in the polyurethane art.

As examples of organic di- and polyisocyanates which can be employed to make the polyurethane foams there can be employed toluene-2,4-diisocyanate; toluene-2,6-diisocyanate; 4-methoxy-1,3-phenylene diisocyanate; diphenyl methane-4,4'-diisocyanate; 4-chloro-1,3-phenylene-diisocyanate; 4-isopropyl-1,3-phenylene-diisocyanate; 4-ethoxy-1,3-phenylene-diisocyanate; 2,4-diisocyanate-diphenylether; 3,3'-dimethyl-4,4'diisocyanateodiphenyl methane; mesitylene diisocyanate; durylene diisocyanate; 4,4'-methylene-bis(phenylisocyanate); benzidine diisocyanate; o-nitrobenzidine diisocyanate; 4,4'-diisocyanatedibenzyl; 3,3'-bitolylene-4,4'-diisocyanate; 1,5-naphthalene diisocyanate; tetramethylene diisocyanate; hexamethylene diisocyanate; decamethylene diisocyanate; toluene-2,4,6-triisocyanate; tritolylmethane triisocyanate; 2,4,4'-triisocyanatodiphenyl ether; the reaction product of toluene diisocyanate with trimethylolpropane; and the reaction product of toluene diisocyanate with 1,2,6-hexanetriol.

Alternatively, as the polyisocyanate there can be used prepolymers made by reacting one or more of the above polyisocyanates with a di- or polyhydroxy compound such as a polyester having terminal hydroxyl groups, a polyhydric alcohol, glycerides or hydroxy containing glycerides, etc. These prepolymers should have terminal isocyanate groups and, to insure their presence, it is frequently desirable to employ an excess of 5% or more of the polyisocyanate in forming the prepolymer. Typical examples of such prepolymers having isocyanate end groups are those formed from toluene diisocyanate and polyhydroxy compounds. In most cases, a mixture of 80% of the 2,4-isomer and 20% of the 2,6-isomer of toluene diisocyanate is employed in making these prepolymers. Thus, there can be used the prepolymers resulting from the reaction between toluene diisocyanate and castor oil, blown tung oil, blown linseed oil or blown soya oil, and of toluene diisocyanate and the polyester of ethylene glycol, propylene glycol and adipic acid.

Examples of suitable polyols are polyethylene glycol, polypropylene glycols, ethylene glycol, diethylene glycol, triethylene glycol, propylene glycol, dipropylene glycol, tripropylene glycol, 1,4-butanediol, thiodiglycol, glycerol, trimethylolethane, trimethylolpropane, ether triols from glycerine and propylene oxide, other containing triols from 1,2,6-hexanetriol and propylene oxide, sorbitol-propylene oxide adducts, pentaerythritol-propylene oxide adducts, trimethylol phenol, oxypropylated sucrose, triethanolamine, pentaerythritol, diethanolamine, castor oil, blown linseed oil, blown soya oil, N,N,N',N'-tetrakis(2-hydroxyethyl) ethylenediamine, N,N,N',N'-tetrakis(2-hydroxypropyl) ethylenediamine, N,N,N',N",N"-pentakis-(2-hydroxypropyl) diethyl triamine, N,N,N',N",N"-pentakis(2-hydroxyethyl) diethylene triamine, mixed ethylene glycol-propylene glycol adipate resin, polyethylene adipate phthalate and polyneopentylene sebacate.

In preparing the foamed polyurethanes there can be used any of the conventional basic catalysts, such, for example, as N-methyl morpholine, N-ethyl morpholine, 1,2,4-trimethylpiperazine, trimethyl amine, triethyl amine, tributyl amine and other trialkyl amines, the esterification product of adipic acid and diethylethanolamine, triethyl amine citrate, 3-morpholinopropionamide, 1,4-bis(2-hydroxypropyl)-2-methylpiperazine, 2-diethylaminoacetamide, 3-diethylaminopropionamide, diethylethanolamine, triethylenediamine, N,N,N',N'-tetrakis(2-hydroxypropyl) ethylenediamine, N,N'-dimethylpiperazine, N,N-dimethylhexahydroaniline, tribenzylamine and sodium phenolate. Also, applicable are tin compounds, e.g. hydrocarbon tin acrylates such as dibutyltin dilaurate, dibutyltin diacetate, dibutyltin dioctoate, tributyltin monolaurate, dimethyltin diacetate, dioctyltin diacetate, dilauryltin diacetate, dibutyltin maleate, hydrocarbon tin alkoxides, e.g. dibutyltin diethoxide, dibutyltin dimethoxide, diethyltin dibutoxide as well as other tin compounds, e.g. octylstannoic acid, trimethyltin hydroxide, trimethyltin chloride, triphenyltin hydroxide, trimethyltin chloride, triphenyltin hydride, triallyltin chloride, trioctyltin fluoride, dibutyltin dibromide, bis(carboethoxymethyl) tin diiodide, tributyltin chloride, trioctyltin acetate, butyltin trichloride, octyltin tris(thiobutoxide), dimethyltin oxide, dibutyl tin oxide, dioctyltin oxide, diphenyltin oxide, stannous octanoate, and stannous oleate.

Any of the conventional surfactants can be used in amounts of 1% or less, e.g. 0.2% by weight of the composition. The preferred surfactants are silicones, e.g. polydimethyl siloxane having a viscosity of 3 to 100 centistokes, triethoxydimethyl polysiloxane, molecular weight 850 copolymerized with a dimethoxypolyethylene glycol having a molecular weight of 750.

The foaming reaction can be carried out by adding water to the polyol prior to or simultaneously with the addition of the polyisocyanate. Alternatively, foams can be prepared by the use of a foaming or blowing agent. These are usually a liquefied, halogen substituted alkane such, for example, as methylene chloride. Especially preferred are those halogen substituted alkanes having at least one fluorine atom in their molecules such as trichlorofluoromethane, dichlorodifluoromethane, dichloromonofluoromethane, chlorodifluoromethane, dichlorotetrafluoroethane. In using these blowing agents, they are uniformly distributed in either the polyol reactant or the polyisocyanate reactant whereupon the reactants are mixed permitting the temperature of the mixture to rise during the ensuing reaction above the boiling point of the liquefied gas so as to produce a porous polyurethane. It should be noted that foaming may also be affected by combining the use of a blowing agent with the addition of water to the polyol.

EXAMPLE 1

To a flask fitted with a thermometer, mechanical stirrer, and a packed distilling column was charged 166 g. (1.0 mole) of triethylphosphite, 192 g. (1.0 moles) of tripropylene glycol, 0.5 g. of sodium methylate and 300 ml. of xylene. The pot was brought to reflux and 119 g. of distillate having a boiling point of 78°–81° C. was collected at a pot temperature of 150° C. The xylene was stripped off at 150° C./0.30 mm. to yield a viscous liquid product which was identified as poly(tripropylene glycol ethylphosphite).

EXAMPLE 2

The product of Example 1 was added dropwise to a refluxing excess of carbon tetrachloride over a 2 hour period. Following this addition, the reactant mixture was heated for 8 hours at reflux temperature. The product was then filtered and stripped of excess carbon tetrachloride. There was obtained 291 g. of a viscous oil. Analysis of the oil gave the following results:
OH No. <1
Acid No.=2.3
$n_D^{25}$=1.4748
% Cl=24.7
Further analysis showed the product to be poly(tripropylene glycol trichloromethyl phosphonate).

EXAMPLE 3

To a flask fitted with a thermometer, mechanical stirrer and a distilling head was charged 67 g. (0.5 moles) of dipropylene glycol, 62 g. (0.5 moles) of trimethyl phosphite and 0.2 g. of sodium methylate under nitrogen pressure. The mixture was heated to 105° C. and maintained at this temperature for 4 hours. The pressure was reduced by water aspiration to approximately 15 millimeters of Hg and the temperature was maintained at 100° C. for another 4 hours. Analysis of the colorless liquid oil showed it to be poly(dipropylene glycol methyl phosphite) having an OH number less than 100 wherein the average value for n was approximately 6. Similar results are obtained when 53. 0g. of triethylene glycol are substituted for the tripropylene glycol in this example.

EXAMPLE 4

The product of Example 3 was charged into a 250 ml. flask containing 230 g. of carbon tetrachloride. The mixture was heated to reflux, the pot temperature rising to 90° C., and maintained at reflux for 3 hours. Excess carbon tetrachloride was removed at 80° C. under aspirator pressure until no more volatiles were collected. 130 g. of crude product was obtained as a heavy oil having the following analysis:
OH No. <1
Acid No.=0.55
% P=11.0%
% Cl=30.8%
Infrared analysis showed the product to be poly(dipropylene glycol trichloromethyl phosphonate).

EXAMPLE 5

A 30 gallon reactor fitted with a vacuum distilling column was charged with approximately 26.2 kg. (195 moles) of dipropylene glycol, 26.6 kg. (214 moles) of trimethyl phosphite and 250 grams of a 25% solution of sodium methylate. The pot temperature was raised from 20° C. to 80° C. over a period of 15 minutes. The temperature was again raised from 80° C. to about 102° C. over 30 minutes and maintained in the range from 100°–110° C. for 45 minutes, during which time a vacuum of 37 millimeters of Hg was applied. The final product was similar to that obtained in Example 3 but had an OH number slightly greater than 20.

EXAMPLE 6

To a 2 liter flask fitted with a thermometer, mechanical stirrer and distilling head is charged 742 grams (7.0 moles of diethylene glycol, 954.8 grams (7.7 moles) of trimethyl phosphite and 1.0 grams of sodium methoxide. The mixture is heated to reflux and after the temperature drops to about 82° C. volatiles are collected. While gradually raising the temperature to about 110° C., the volatiles are continually collected. A total of 424 grams of volatiles are collected (theory 448 grams). The charge is then stripped at 110° C. under aspirator pressure. The temperature drops to 85° C. and the charge is maintained at this temperature and further stripped for an additional 20 minutes. Analysis of the liquid product showed it to be poly(diethylene glycol methyl phosphite) having an OH number of about 30.

EXAMPLE 7

A polyurethane foam was prepared by employing the following formulation:

| | | |
|---|---|---|
| Propoxylated glycerol (3000 mol. wt.) | 100 | g. |
| Poly(dipropylene glycol methyl phosphite) prepared according to the procedure of Example 3 but having an OH No. = 167 | 15 | g. |
| Water | 3.6 | g. |
| 33% Solution of diazobicyclooctane in dipropylene glycol | 0.35 | g. |
| 67% Solution of dimethylaminoethyl ether in dipropylene glycol | 0.12 | g. |

-continued

| | | |
|---|---|---|
| Trichlorofluoromethane | 3.0 | g. |
| Dimethylformamide | 3.0 | g. |
| Silicone Surfactant | 1.5 | g. |
| 50% Stannous octoate in dioctyl phthalate | 0.6 | g. |
| Toluene diisocyanate (80/20 isomers) | 49.9 | g. |

The foam was tested according to ASTM-D1692 and proved to be a self-extinguishing, flexible foam.

EXAMPLE 8

A polyurethane foam was prepared by employing the following formulation:

| | | |
|---|---|---|
| Propoxylated glycerol (3000 mol. wt.) | 100 | g. |
| Poly(dipropylene glycol trichloromethyl phosphonate) prepared according to Example 4 | 15 | g. |
| Silicone Surfacant | 1.5 | g. |
| Water | 3.9 | g. |
| Dimethylethanolamine | 0.3 | g. |
| Dimethylformamide | 3.0 | g. |
| Methylene chloride | 3.0 | g. |
| 50% Stannous octoate in dioctyl phthalate | 0.7 | g. |
| N-methyl-N'-(dimethylaminoethyl)-piperazine | 0.1 | g. |
| Toluene diisocyanate (80/20 isomers) | 50.1 | g. |

The resultant product was a flexible foam that was self-extinguishing upon dry heat aging at 140° C. for 22 hours.

EXAMPLE 9

A polyurethane foam was prepared by employing the following formulation:

| | | |
|---|---|---|
| Propoxylated glycerol (3000 mol. wt.) | 100 | g. |
| Poly(diethylene glycol methyl phosphite) prepared according to the procedure of Example 6 | 10 | g. |
| Water | 4.5 | g. |
| Silicone surfactant (L-548 made by Union Carbide) | 1.0 | g. |
| N-ethylmorpholine | 0.07 | g. |
| 67% solution of dimethylaminoethyl ether in dipropylene glycol | 0.07 | g. |
| 33% solution of 1,4-diazobicyclo [2.2.2] octane in dipropylene glycol | 0.07 | g. |
| 50% solution of stannous octoate in dioctyl phthalate | 0.4 | g. |
| Toluene diisocyanate (80/20 isomers) | 60.5 | g. |

The resultant product was a flexible foam that was self-extinguishing when tested according to Motor Vehicle Safety Standard 302 Flammability Test.

EXAMPLE 10

Employing the process of Example 4 with the exception that only 36.0 g. of carbon tetrachloride is used, the reaction product is a mixed polyalkylene glycol methyl phosphite polyalkylene glycol trichloromethyl phosphonate polymer. This polymer yields a self-extinguishing foam when employed in the formulations of Example 7 and has the added advantage of rendering color stable foams, even when very large bun sizes are made.

What is claimed:

1. A polyphosphorous mixed phosphite-phosphonate polymer flame retardant having an OH number less than one and containing both alkyl phosphite and haloalkyl phosphonate linkages, said polyphosphorus polymer represented by the formula:

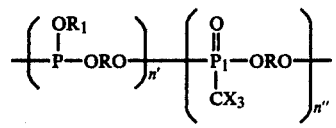

where $R_1$ is alkyl; R is a polyalkylene glycol residue defined as that portion derived from a polyalkylene glycol having the formula:

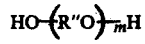

wherein R" is an alkylene group of from 2 to about 20 carbon atoms, and m designates the number of repeating alkylene ether units and is from 2 to 20; X is a halogen; and n' and n" are numbers such that the sum of n' and n" is an integer in the range from about 4 to about 50.

2. The flame retardant of claim 1 where $R_1$ is methyl, X is selected from the group consisting of chlorine and bromine, and R is a polyalkylene glycol residue selected from the group consisting of diethylene glycol, dipropylene glycol, triethylene glycol, and tripropylene glycol.

3. The flame retardant of claim 2 wherein $R_1$ is methyl, X is selected from the group consisting of chlorine or bromine, and R is a diethylene glycol residue.

4. The polyphosphorus flame retardant of claim 1 wherein the sum of n' and n" is an integer in the range of from about 4 to about 10.

* * * * *